(12) United States Patent
Bedare et al.

(10) Patent No.: US 12,463,499 B2
(45) Date of Patent: Nov. 4, 2025

(54) ELECTRIC MOTOR FOR A MOTOR VEHICLE AND MOTOR HOUSING FOR AN ELECTRIC MOTOR

(71) Applicant: Brose Fahrzeugteile SE & Co. Kommanditgesellschaft, Würzburg, Würzburg (DE)

(72) Inventors: Amit Bedare, Pune (IN); Dominik Fenten, Güntersleben (DE); Keshar Shendare, Pune (IN)

(73) Assignee: Brose Fahrzeugteile SE & Co. Kommanditgesellschaft, Würzburg, Würzburg (DE)

( * ) Notice: Subject to any disclaimer, the term of this patent is extended or adjusted under 35 U.S.C. 154(b) by 223 days.

(21) Appl. No.: 18/337,580

(22) Filed: Jun. 20, 2023

(65) Prior Publication Data

US 2023/0353010 A1 Nov. 2, 2023

Related U.S. Application Data

(63) Continuation of application No. PCT/DE2021/100989, filed on Dec. 9, 2021.

(30) Foreign Application Priority Data

Dec. 18, 2020 (IN) .............................. 202041055125

(51) Int. Cl.
*H02K 1/18* (2006.01)
*H02K 5/15* (2006.01)
*H02K 5/22* (2006.01)

(52) U.S. Cl.
CPC ............... *H02K 5/225* (2013.01); *H02K 1/18* (2013.01); *H02K 5/15* (2013.01)

(58) Field of Classification Search
CPC ............ H02K 5/225; H02K 5/04; H02K 1/18; H02K 1/185; H02K 3/50; H02K 3/52; H02K 5/15

(Continued)

(56) References Cited

U.S. PATENT DOCUMENTS 8,836,184 B2 9/2014 Cho et al.
2013/0099609 A1* 4/2013 Ikeno ..................... H02K 29/08
310/68 B (Continued)

FOREIGN PATENT DOCUMENTS

DE 102017202262 A1 8/2018
EP 2619457 A1 7/2013

(Continued)

OTHER PUBLICATIONS

Obendorfer et al., Stator of an Electric Motor, Nov. 12, 2020, WO 2020225248 (English Machine Translation) (Year: 2020).*

*Primary Examiner* — Alexander A Singh
(74) *Attorney, Agent, or Firm* — Laurence A. Greenberg; Werner H. Stemer; Ralph E. Locher

(57) ABSTRACT

An electric motor for a motor vehicle includes a motor housing and a stator which is received in the motor housing and has a phase connection accommodated in a holding element. A housing floor of the motor housing has a feed-through opening. The phase connection and the holding element project through the feed-through opening for anti-torsion protection of the stator. A motor housing for such an electric motor is also provided.

11 Claims, 4 Drawing Sheets

(58) Field of Classification Search
USPC .......................................................... 310/71
See application file for complete search history.

(56) References Cited

U.S. PATENT DOCUMENTS

2020/0195083 A1\* 6/2020 Ueno ................... H02K 5/1732
2021/0305884 A1\* 9/2021 Takahashi .......... H02K 11/0141

FOREIGN PATENT DOCUMENTS

FR 2918221 A1 1/2009
WO WO-2020225248 A1 \* 11/2020 ............... H02K 1/16

\* cited by examiner

ELECTRIC MOTOR FOR A MOTOR VEHICLE AND MOTOR HOUSING FOR AN ELECTRIC MOTOR

CROSS-REFERENCE TO RELATED APPLICATION

This application is a continuation, under 35 U.S.C. § 120, of copending International Patent Application PCT/DE2021/100989, filed Dec. 9, 2021, which designated the United States; this application also claims the priority, under 35 U.S.C. § 119, of Indian Patent Application IN 202041055125, filed, Dec. 18, 2020; the prior applications are herewith incorporated by reference in their entirety.

FIELD AND BACKGROUND OF THE INVENTION

The invention relates to an electric motor for a motor vehicle having a motor housing and having a stator disposed therein. The invention further relates to a motor housing for an electric motor of this kind.

An electric motor is used in a motor vehicle as a drive for different actuating elements. For example, the drive is used as a window drive, a sunroof drive or a seat adjustment drive, as a power steering drive (EPS, Electrical Power Steering), as a radiator fan drive or as a gear actuator. Electric motors of that kind must have a comparatively high torque or power density and, in particular, be reliable even at high temperatures.

A brushless electric motor acting as an electrical (three-phase) machine customarily has a stator provided with a field or stator winding which is disposed coaxially to a rotor having one or multiple permanent magnets. Both the rotor and the stator are configured as laminated cores, for example, wherein stator teeth support the coils of the field winding in stator grooves formed between the stator teeth.

For reliable and, in particular, low-noise motor operation, it is necessary for the stator to be held and positioned securely in the motor housing. In particular, anti-torsion protection of the stator which secures the stator in respect of torsion in the circumferential direction of the stator, in other words in respect of tangential torsion, or else prevents mechanical torsion of that kind wherever possible, is desirable in that case.

For example, the stator in that case is frequently shrink-fitted straight into the motor housing or fastened in the motor housing by encapsulation or bonding. With variants of that kind, the anti-torsion protection against mechanical torsion is achieved directly through force-locking by an interference fit assembly or through substance or material bonding by virtue of encapsulation or an adhesive bond. Disadvantageously, however, it is therefore not easily possible for the stator to be uncoupled from the motor housing for repairs or maintenance work.

In this case, and in the following, a "force lock" or a "force-locking connection" between at least two parts which are connected to one another is particularly understood to mean that the parts which are connected to one another are prevented from sliding against one another by virtue of a frictional force acting between them. If a "connection force" (this means the force which presses the parts against one another, for example a bolt force or the weight force itself) causing this frictional force does not exist, the force-locking connection cannot be maintained and is therefore disengaged.

In this case, and in the following, a "substance bond" or a "substance-bonded connection" between at least two parts which are connected to one another should be understood to mean that the parts which are connected to one another are held together at their contact faces by combining substances or encapsulation (for example by virtue of atomic or molecular bonding forces), where appropriate under the action of an additive substance.

It is furthermore possible, for example, to arrange and/or hold the stator within the motor housing by using uncoupling elements. With uncoupled variants of that kind, however, additional, separate securing elements are needed for the anti-torsion protection of the stator. For example, radial lugs or tabs are provided in that case at the interface between the stator and the internal wall of the motor housing, in particular for form-locking anti-torsion protection.

In this case, and in the following, a "form lock" or a "form-locking connection" between at least two parts which are connected to one another is particularly understood to mean that the parts which are connected to one another are held together in at least one direction by a direct engagement of contours of the parts themselves or by an indirect engagement by using an additional connection part. The "locking" of a reciprocal movement in this direction is therefore form-related.

SUMMARY OF THE INVENTION

It is accordingly an object of the invention to provide a particularly suitable electric motor for a motor vehicle and a particularly suitable motor housing for an electric motor, which overcome the hereinafore-mentioned disadvantages of the heretofore-known motors and motor housings of this general type and which achieve reliable and structurally simple anti-torsion protection of a stator within the motor housing.

With the foregoing and other objects in view there is provided, in accordance with the invention, an electric motor for a motor vehicle, comprising:
  a motor housing having a housing floor,
  a stator which is received in the motor housing and has a phase connection which is accommodated in a holding element,
  the housing floor of the motor housing having a feed-through opening, and
  for anti-torsion protection of the stator, the phase connection and the holding element project through the feed-through opening.

With the objects of the invention in view, there is also provided a motor housing for an electric motor according to the invention, wherein a housing floor has a feed-through opening for a phase connection of a stator and a side wall which delimits the feed-through opening in the circumferential direction is inclined relative to the radial direction.

Advantageous embodiments and developments are the subject matter of the dependent claims. The advantages and embodiments specified with regard to the electric motor can also be transferred analogously to the motor housing, and vice versa.

The electric motor has a motor housing in which the stator of the electric motor is housed. In other words, the stator is disposed in the motor housing. Advantageously, the motor housing, which is also referred to as the pole housing or also as the housing for short, has a cup-shaped configuration. If need be, the motor housing has a housing floor. This extends in a suitable manner perpendicularly to the axial direction of the electric motor.

A feed-through opening, in particular in the manner of a continuous recess or in the manner of a cutout, is disposed in the housing floor of the motor housing. In other words, the housing floor has a feed-through opening. This is continuous in the axial direction. Consequently, a first (stator) region in which the stator is disposed and a second (electronic) region or an electronic compartment which is provided for receiving electronic equipment of the electric motor, for example, is advantageously connected with the help of the feed-through opening. The housing floor therefore advantageously forms a wall between these two regions.

In particular, the electric motor is configured as a brushless electric motor. This has a stator core with a number of stator teeth disposed in a star shape, for example, which support an electrical rotating-field or stator winding in the form of individual coils. These coils are wound from an insulated wire, for example. If need be, the coils with their coil ends (winding wire ends) are assigned to individual strands or phases and switched among one another in a predefined manner and guided to a phase connection assigned in each case in order to energize the rotating-field winding, in other words electrically connected to the phase connection.

According to the invention, at least one of the phase connections is at least partially received in a holding element, wherein for anti-torsion protection of the stator the phase connection and the holding element project through the feed-through opening, advantageously in an axial direction. In other words, the holding element is disposed with the phase connection received therein in the feed-through opening of the housing floor and guided through the opening. In particular, the phase connection and the holding element project from the first region into the second region of the motor housing.

The holding element projecting through the feed-through opening in this case restricts an adjustment of the phase connection in the circumferential direction and therefore torsion of the stator connected, advantageously in a torque-proof manner, to the phase connection in the through-opening.

In summary, anti-torsion protection of the stator is advantageously created with the help of a form-locking connection between the motor housing and the holding element to the phase connections of the stator disposed therein. The form lock in this case also acts in, and against, the circumferential direction, so that the stator is reliably secured to prevent tangential torsion, in other words torsion in the circumferential direction, within the motor housing. In this way, structurally simple and reliable anti-torsion protection is achieved for the stator. In particular, no additional joining contours or, by comparison with the methods mentioned above, no additional securing elements or disadvantageous substance-bonded or force-locking anti-torsion protection for the stator is needed.

In this case and in the following, "axial direction" is understood to mean, in particular, a direction parallel (co-axial) to the rotational axis of the electric motor and therefore perpendicular to the front sides of the stator. Accordingly, in this case and in the following, the "radial direction" is in particular understood to mean a direction oriented perpendicularly (transversely) to the rotational axis or the perpendicularly to the axial direction of the electric motor along a radius of the stator or of the electric motor. In this case, the radial direction starting from the rotational axis is directed (radially) outwardly. In this case and in the following, the "circumferential direction", which is also referred to as the tangential direction or as the azimuthal direction, is understood to mean, in particular, a direction along the circumference of the stator, in other words a direction perpendicular to the axial direction and to the radial direction.

For example, the housing floor has further feed-through openings which, analogously, have further holding elements with phase connections received therein projecting through them.

Depending on the configuration of the stator wiring, in particular the arrangement of the phase connections thereof, more than one (single) phase connection can also be disposed in the holding element, or in each of the holding elements, in this case. Insofar as embodiments of the holding element and/or of the feed-through opening are described in this case and in the following, these comments also apply analogously to a further holding element and/or feed-through openings.

In accordance with an advantageous embodiment, in order to improve the bending resistance of the holding element, a rib is formed on the holding element at the end in the circumferential direction. A rib of this kind is preferably formed on both ends in and against the circumferential direction in each case. The rib, or each of the ribs, therefore project(s) from an outer front side of the holding element in respect of the circumferential direction and advantageously extends in the circumferential direction. For a comparatively high bending resistance, the height of the rib, or of each rib, in other words the extent thereof in the axial direction, is preferably at least one-third, particularly preferably at least half, of the distance between a bearing region of the housing floor on the holding element and the end of the holding element on the stator side.

With the help of the ribs, a deformation of the holding element which is pressed against the housing floor, in particular against a wall of the housing floor delimiting the feed-through opening, during torsion of the stator, and of the phase connection disposed therein is avoided or a risk of this is at least reduced.

For example, the rib has a rectangular or a triangular basic shape. According to a suitable development, however, the rib extends smoothly into the holding element. In other words, a transitional portion between the rib and the holding element is edge-free and corner-free. A force acting on the holding element during torsion is therefore particularly effectively diverted with the help of the rib. For a comparatively high bending resistance, the height of the transitional portion, in other words the extent thereof in the axial direction, is preferably at least a quarter, particularly preferably at least a third, of the distance between a bearing region of the housing floor on the holding element and the end of the holding element on the stator side.

In a preferred embodiment, the holding element is disposed on a, particularly ring-shaped, wiring unit of the stator. The holding element in this case rises perpendicularly to the wiring unit in the axial direction. The wiring unit, also referred to as the contact unit, wiring ring or switch unit, is advantageously coupled with the stator in a torque-proof manner. In this way, the stator is held in the motor housing by the holding element in a torsion-proof manner.

The holding element is suitably formed integrally, in other words in one piece or monolithically, on the wiring unit. In this way, the stability of the anti-torsion protection is improved. Furthermore, a reduction in the number of components or a functional integration of the anti-torsion protection and the wiring unit is thereby facilitated.

According to a suitable development, the wall of the housing floor which delimits the feed-through opening in the circumferential direction forms an abutment region for the holding element during rotation of the stator, in other words during torsion of the stator relative to the motor housing. This wall is referred to below as the side wall. The side wall is inclined, at least in the abutment region, in respect of the radial direction, so that when the stator rotates, a radially outwardly directed component of the deformation force acting on the holding element, in other words a component of the deformation force in the radial direction, is produced. The abutment region of the side wall therefore spans a plane in which the axial direction lies which, however, is inclined in respect of the radial direction. In summary, the incline of this wall is used for force conversion, in particular for force deflection. A loading of the holding element and, associated with this, the risk of deformation which can damage the phase connection or the contact point thereof with an electronic system, is thereby advantageously reduced.

This preferably applies analogously to the wall of the housing floor which delimits the feed-through opening towards the circumferential direction.

According to an advantageous embodiment, a radially inwardly projecting bearing shoulder for the holding element is disposed on the wall which delimits the feed-through opening in a radial direction, in other words the wall of the housing floor delimiting the feed-through opening (through-opening) radially on the outside. This wall is also referred to in the following as the radial wall. In particular, the bearing shoulder is formed on the housing floor. In particular, the bearing shoulder is formed on the housing floor. Particularly preferably, the bearing shoulder is disposed in an end region of the through-opening in respect of the circumferential direction.

In other words, the bearing shoulder projects radially inwardly in the feed-through opening. With the help of the bearing shoulder, further deformation of the holding element in the radial direction is advantageously prevented, particularly insofar as a radial component of the deformation force is produced with the help of the incline of the side wall.

In an advantageous embodiment, the holding element has a base in the region of the feed-through opening. In other words, the holding element is extended in a base-like manner in the region of the feed-through opening. The front side of the base disposed on the outside in the circumferential direction in this case, so the outer side thereof in respect of the circumferential direction, forms a bearing region for the housing floor, in particular for the side wall, during rotation of the stator, in other words during the torsion thereof in respect of the motor housing.

The base in this case advantageously extends from an end of the holding element on the stator side, in particular starting from the wiring unit, in the axial direction.

The base serves to increase the bending resistance of the holding element. For example, the base has a comparatively large wall thickness, in particular by comparison with the further portions of the holding element, which do not come into contact with the housing floor during the twisting of the stator.

According to an advantageous embodiment, the front side of the holding element disposed on the outside in the circumferential direction—or insofar as the holding element has a base, the front side of the base—is oriented in such a manner that, when placed against the side wall of the housing floor, the front side extends parallel to the side wall, in particular parallel to the abutment region of the side wall. In this way, a comparatively large bearing surface is achieved between the holding element and the side wall. Consequently, a comparatively uniform distribution of a deformation force on the holding element is advantageously produced.

The same advantageously applies in this case to the front side of the holding element disposed on the outside against the circumferential direction.

In accordance with an advantageous embodiment, the feed-through opening has an extent in the circumferential direction, so that torsion of the stator is limited to under 5°, in particular under 2°, preferably under 1°.

In particular, the electric motor is provided and set up for use in a motor vehicle. For example, an adjustment drive or a steering motor of the motor vehicle is created by using the electric motor.

The motor housing according to the invention is suitable for an electric motor in one of the variants described above, and is provided and set up therefor. The motor housing in this case has a housing floor with a feed-through opening for the phase connection of the stator, wherein a side wall which delimits the feed-through opening in the circumferential direction is inclined in respect of the radial direction.

Other features which are considered as characteristic for the invention are set forth in the appended claims.

Although the invention is illustrated and described herein as embodied in an electric motor for a motor vehicle and a motor housing for an electric motor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
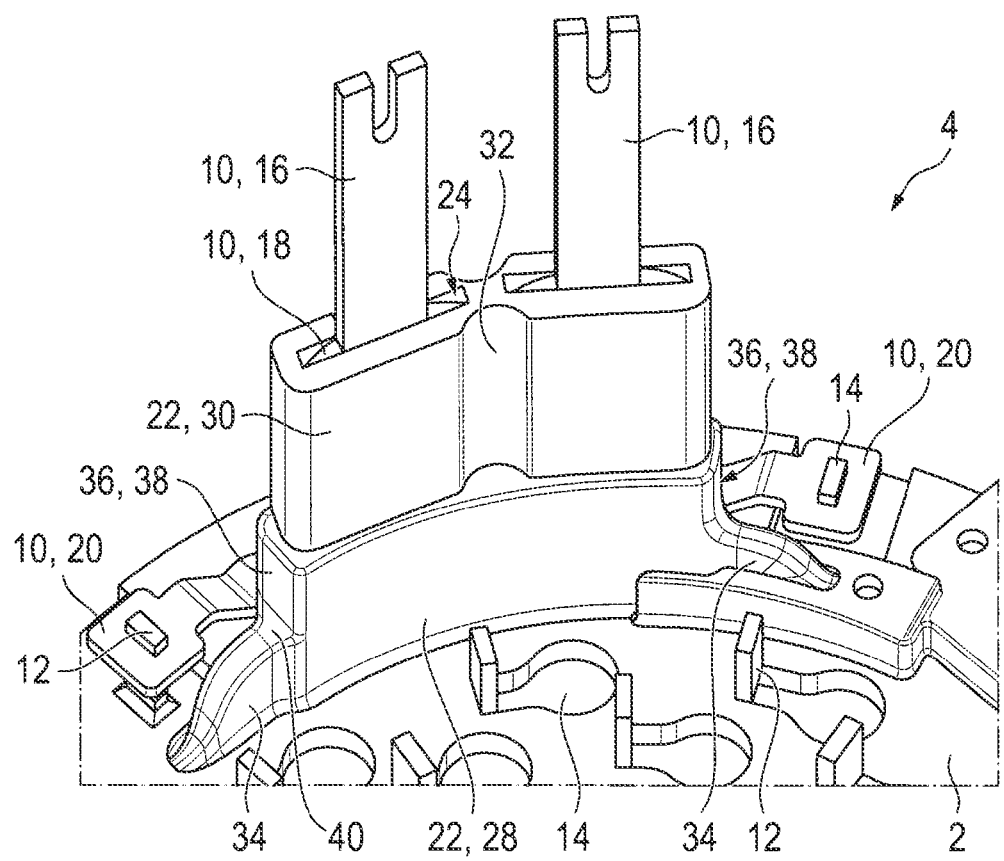
FIG. 1 is a fragmentary, diagrammatic, perspective view of a wiring unit of an electric motor, having two phase connections for the stator of the electric motor, wherein the phase connections are received in a holding element formed on the wiring unit.
Figure 1:
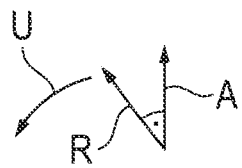
Figure 2:
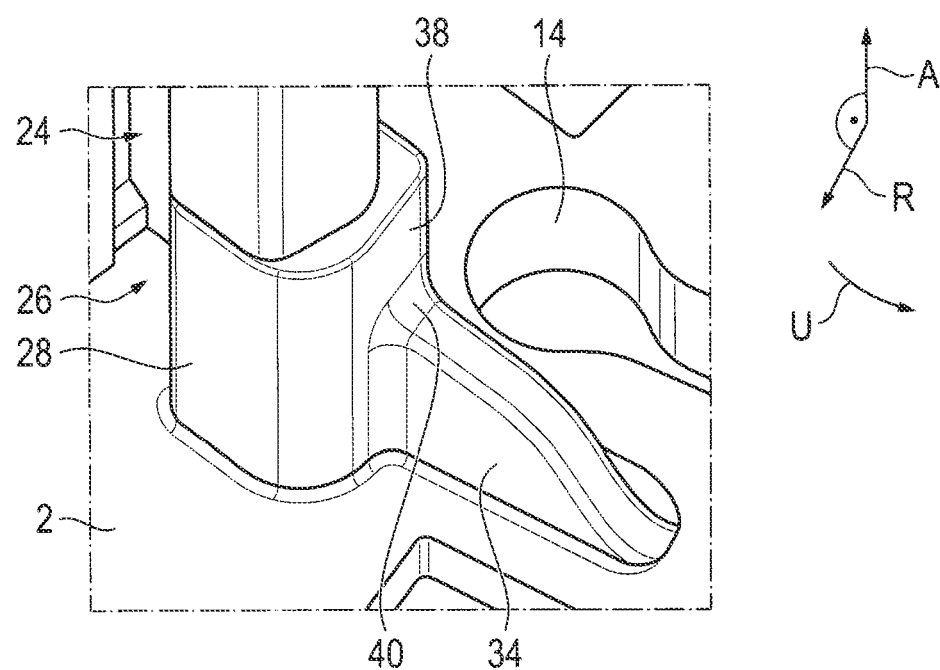
FIG. 2 is a fragmentary, enlarged perspective view of the holding element, wherein the holding element has a base region rising from the wiring unit in an axial direction, on which base region a rib is formed on either side in relation to the circumferential direction.
Figure 3:
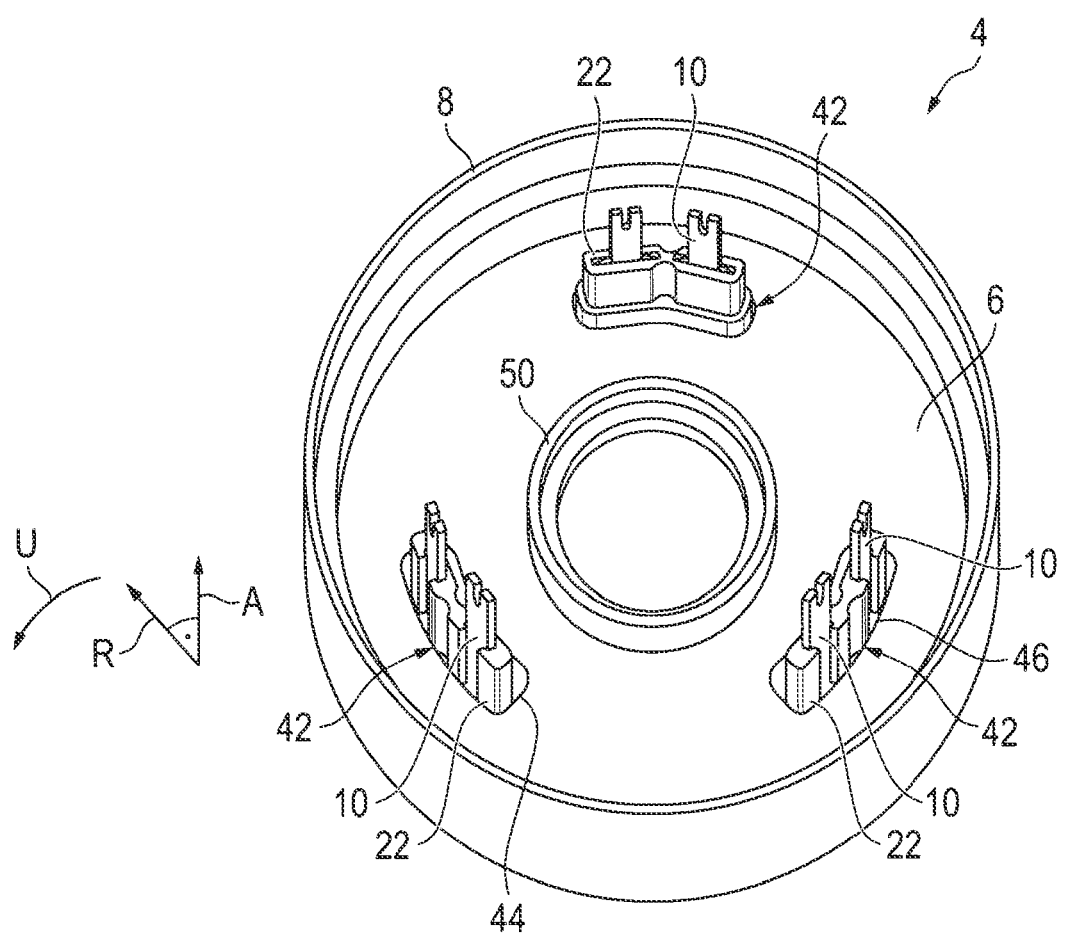
FIG. 3 is a perspective view of a portion of the motor housing of the electric motor, wherein a housing floor of the motor housing has three curved feed-through openings each of which have a holding element accommodating two phase connections projecting through them.
Figure 4:
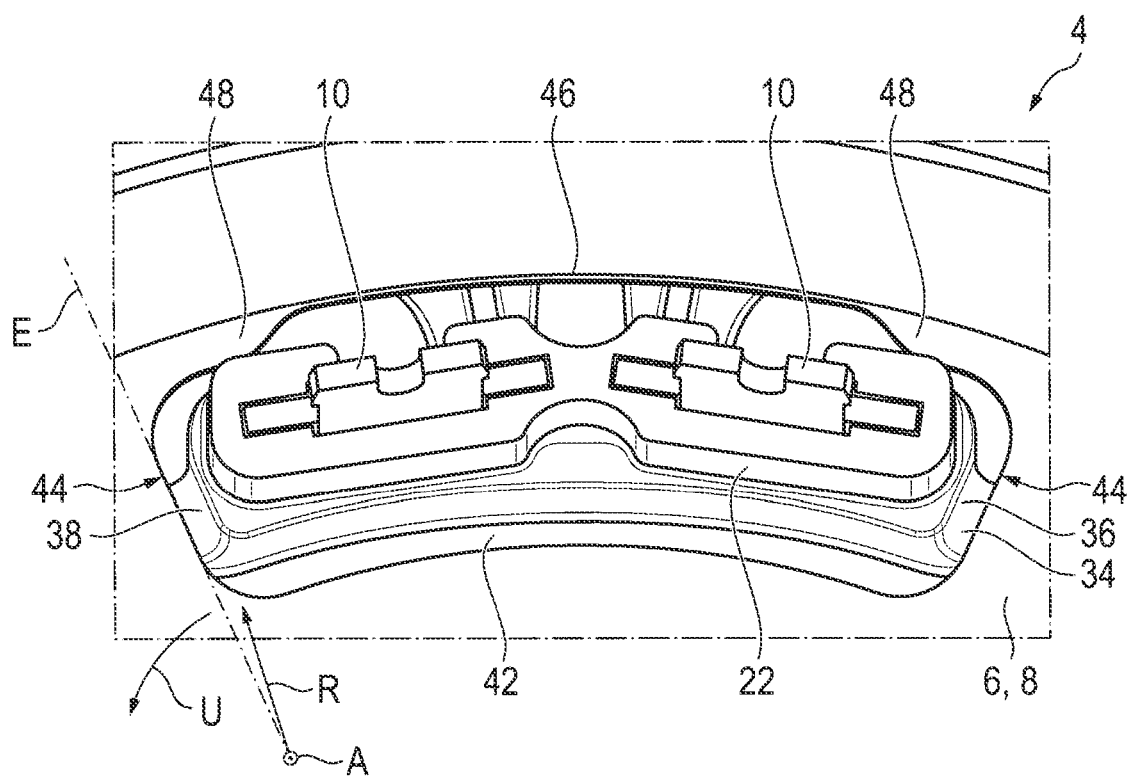
FIG. 4 is a fragmentary, perspective, plan view of the housing floor with an alternative embodiment of the electric motor in which two bearing shoulders for the holding element are formed on the radial outside end of the feed-through opening.

Referring now in detail to the figures of the drawings, in which mutually corresponding parts and sizes are constantly provided with the same reference numerals, and first, particularly, to FIG. 1 thereof, there is seen a wiring unit 2 of an electric motor 4. The wiring unit is disposed on the front side of a stator winding, which is not further depicted, of a stator of the electric motor 4. As can be seen in FIGS. 3 and 4, in particular, the wiring unit 2 is disposed between the stator winding and a housing floor 6 of a motor housing 8 in which the stator is received.

In the adjacent directional diagram, the axial direction of the electric motor is denoted by the reference letter A, the radial direction by the reference letter R and the circumferential direction, also referred to as the tangential or as the azimuthal direction, by the reference letter U.

The wiring unit 2 is configured as a plastic injection-molded part and it is coupled with the stator in a torque-proof manner. Furthermore, the wiring unit 2 has a stamped grid integrated in the plastic, in other words encapsulated therein, with the help of which coil ends (not further depicted) of stator coils, which are not shown in greater detail, can be connected to one another and/or to phase connections 10 for the stator in an electrically conductive manner. In other words, the wiring unit 2 is provided and configured for the wiring of the stator coils (of the stator winding) amongst one another and/or for the wiring of the stator coils with the phase connections 10.

For the electrical contacting of the coil ends and the phase connections 10, the stamped grid includes a number of contact lugs 12 which in this case project from the plastics body in the axial direction A. In addition, the ring-shaped wiring unit 2 has hole-shaped feed-throughs 14 for the coil ends. During assembly, the coil ends are guided through the feed-throughs 14 and the wiring unit 2 is then turned, so that the coil ends and the contact lugs 12 are in contact or can at least be connected to one another.

Furthermore, each of the phase connections 10 is electrically connected to one of the contact lugs 12. Each of the phase connections 10 has a first portion 16, a second portion 18 and a third portion 20. The first portion 16 in this case is provided for making contact with an electronic system and/or a power source. The third portion 20 is used for making electrical contact with one of the contact lugs 12 of the wiring unit 2. The second portion 18, which is disposed between the first and the third portions, is introduced into a holding element 22. In this case, the first and the second portions 16, 18 span a common plane, wherein the third portion 20 runs at an angle thereto.

As can be seen particularly in FIGS. 3 and 4, the electric motor 4 has three holding elements 22, in each of which two phase connections 10 are accommodated alongside one another in the circumferential direction U. Each of the holding elements 22 has a pocket-shaped receiving device 24 for the second portion 18, in which the phase connection, in particular the second portion 18, can be inserted. In this case, a slot-shaped opening 26 extending in the axial direction on the radially outer side in each case is provided, through which opening the third portion 20 of the respective phase connection 10 is guided during assembly.

Insofar as in this case and in the following, reference is made to a (single) holding element 22, the comments apply analogously to the other holding elements.

Each of the phase connections 10, in particular the second portion 18 thereof, is therefore accommodated in a holding element 22 and held in position by the holding element. Each of the holding elements 22 in this case is formed in one piece on the wiring unit 2 and rises in the axial direction A to the wiring unit 2.

The holding element 22 in this case has portions. Abutting the wiring unit 2 in the axial direction A, the holding element has a base 28 as the first portion, and in the axial direction A, it has an end portion 30 adjacent thereto as the second portion. In other words, the base 28 is disposed between the wiring unit 2 and the end portion 30 in respect of the axial direction A.

By comparison with the end portion 30, the base 28 is extended in the circumferential direction U and in the radial direction R. The base 28 therefore has a comparatively high bending resistance. In the end portion 30 of the holding element, notches 32 or recesses engaging in the radial direction R and against the radial direction R are introduced. Due to this—and a wall thickness of the end portion 30 which is thinner by comparison with the base 28, for example—during a deformation of the holding element 22 in the region of one of the phase connections 10 with a rotation of the stator, the region of the other phase connection 10 accommodated in the holding element 22 is advantageously co-formed and carried along to a lesser degree.

In order to increase the bending resistance, a rib 34 is formed in each case on the holding element 22, in this case on the base 28 thereof, at the end side in the circumferential direction U and at the end side against the circumferential direction U. The ribs 34 therefore project from an outer front side 36 of the holding element 22 in respect of the circumferential direction U and extend in the circumferential direction U.

In the axial direction A across the ribs 34, with the help of the outer front side 36 in each case, a bearing region 38 for the housing floor 6 is formed during torsion of the stator in respect of the motor housing 8.

In this case, the height of the rib 34, or of each rib 34, in other words the extent thereof in the axial direction A, is roughly half the extent of the base 28 in the axial direction A. Consequently, a comparatively high bending resistance of the holding element 22 is achieved. The height of the rib 34, or of each rib 34, is furthermore more than half the distance between the bearing region 38 of the base 28 for the housing floor 6 on the stator-side end of the holding element 22. Consequently, a comparatively high bending resistance of the holding element 22 is achieved.

The ribs 34 run away smoothly into the holding element 22, namely into the base 28. In other words, a transitional portion 40 is formed between the respective rib and the holding element 22, so that no edges or corners are formed in the region in which the rib merges into the holding element 22. For a comparatively high bending resistance, the height of the transitional portion 40, in other words the extent thereof in the axial direction, is preferably roughly a quarter of the height of the base 28 and therefore more than a third of the distance between the bearing region 38 of the housing floor on the holding element 22 and the end of the holding element 22 on the stator side.

As can be identified in FIGS. 3 and 4, in particular, the motor housing 8 has a housing floor 6 with a feed-through opening 42 in each case for each of the holding elements 22. In this case, the holding elements 22 and also the phase connections 10 accommodated therein project through the respective feed-through opening 42 from one side of the housing floor 6 to the other side of the housing floor 6. In other words, the phase connections 10 are guided from a side of the housing floor 6 facing the stator to an opposite side of the housing floor 6, in particular facing a motor electronic system. The base 28 is therefore disposed in the region of the feed-through opening 42.

With the help of the projection of the holding element through the feed-through opening 42 in the housing floor 6 thereof, a form lock is created to prevent rotation of the stator connected by the wiring unit 2 and by the holding element 22 in a torque-proof (non-rotatable) manner relative to the housing floor 6. In other words, with the help of the, or each, through-opening 42 and the, or each, holding element 22, torsion of the stator in respect of the motor housing 8 is limited.

Insofar as in this case, and in the following, reference is made to the feed-through opening 42, the comments apply analogously to the other feed-through openings 42.

The feed-through opening 42 is delimited in, and against, the circumferential direction U in each case with the help of a side wall 44. Each of the side walls 44 in this case forms an abutment region for the holding element 22 during a rotation of the stator and, associated with this, during a rotation of the wiring unit 2 including the holding elements 22 formed thereon. The side walls 44 in this case are each inclined in respect of the radial direction R—at least in the abutment region formed thereby. The abutment region of the side wall 44 therefore covers a plane E in which the axial direction A lies, which, however, is inclined in respect of the radial direction R. In FIG. 4, this plane E is depicted as a dot-and-dash line so that it can be recognized more easily. This plane E is twisted in respect of the radial direction, wherein the rotational axis runs parallel to the axial direction A. In other words, an angle is formed between the radial direction R and the plane.

With the help of this incline, during a rotation (twisting) of the stator, a radially outwardly directed component of a deformation force acting on the holding element 22 is produced, with the help of which a (bending) load of the holding element 22 and, associated with this, the risk of a comparatively large deformation is at least reduced.

The front side 36 of the base 28 in each case, in particular the bearing region 38 thereof, is oriented in such a manner that it extends parallel to this side wall 44 when it lies adjacent to or impacts against the respective side wall 44 which delimits the feed-through opening 42 in, or against, the circumferential direction U. In other words, the shape of the bearing portion 38 corresponds to the shape of the front side 36 adjacent thereto. Consequently, a comparatively uniform force distribution is produced during a stator rotation.

As can be seen in the variant of the housing floor in accordance with FIG. 4, two radially inwardly projecting bearing shoulders 48 for the holding element 22 are disposed on a (radial) wall 46 which delimits the feed-through opening 42 in the radial direction. In this case, the bearing shoulders 48 are formed on the housing floor 6. One of the bearing shoulders 48 in this case is disposed in an end region of the feed-through opening 42 in the circumferential direction U and the second bearing shoulder 48 is disposed in this end region of the feed-through opening 42 against the circumferential direction U. With the help of the bearing shoulders 48, a further deformation of the holding element 22 in the radial direction is advantageously prevented.

The feed-through opening 42 has an extent in the circumferential direction U, so that torsion of the stator is limited to under 5°, in particular under 2°, preferably under 1°. In other words, the feed-through opening 42 and, accordingly, the extent of the holding element 22 is of such a size in the circumferential direction U that torsion of the stator of 5° or more, in particular of 2° or more, preferably of 1° or more, due to the impact of the holding element 22 at the feed-through opening 42, is avoided.

Through the use of the housing floor 6, a centrally disposed bearing seat 50 is furthermore formed, which is provided and set up for receiving and holding a bearing (not shown), for example a ball bearing, for a motor shaft of the electric motor 4. The bearing seat 50 in this case is integrally formed on the housing floor 6. This means that the bearing seat is configured as an inwardly drawn region of the housing floor.

In the motor housing 8, the stator and rotor thereof are disposed in a manner which is not depicted further. In this case, the wiring unit 2 is disposed between the stator and the housing floor 6.

The invention is not limited to the previously described exemplary embodiments. Instead, other variants of the invention can also be deduced from them by the person skilled in the art without departing from the subject matter of the invention. In particular, all individual features described in connection with the exemplary embodiments can also be combined with one another in this manner without departing from the subject matter of the invention.

The following is a summary list of reference numerals and the corresponding structure used in the above description of the invention.

LIST OF REFERENCE NUMERALS 2 wiring unit
4 electric motor
6 housing floor
8 motor housing
10 phase connection
12 contact lug
14 feed-through
16 first portion of the phase connection
18 second portion of the phase connection
20 third portion of the phase connection
22 holding element
24 receiving device
26 opening
28 base
30 end portion
32 notch
34 rib
36 side of the base
38 bearing region
40 transitional portion
42 feed-through opening
44 wall
46 wall
48 bearing shoulder
50 bearing seat
A axial direction
R radial direction
U circumferential direction
E plane

The invention claimed is:

1. An electric motor for a motor vehicle, the electric motor comprising:
   a motor housing having a housing floor;
   a holding element;
   a stator received in said motor housing, said stator having a phase connection accommodated in said holding element;
   said housing floor of said motor housing having a feed-through opening formed therein;
   said phase connection and said holding element projecting through said feed-through opening for anti-torsion protection of said stator;
   a wall delimiting said feed-through opening in a radial direction; and
   a radially-inwardly projecting bearing shoulder for said holding element, said radially-inwardly projecting bearing shoulder being disposed on said wall delimiting said feed-through opening.

2. The electric motor according to claim 1, which further comprises a rib formed on an end of said holding element in a circumferential direction for improving bending resistance.

3. The electric motor according to claim 2, wherein said rib extends smoothly into said holding element.

4. The electric motor according to claim 1, which further comprises a wiring unit disposed or formed on a front side of said stator, said holding element being disposed on said wiring unit.

5. The electric motor according to claim 1, which further comprises:
 a side wall delimiting said feed-through opening in a circumferential direction;
 said side wall forming an abutment region for said holding element during rotation of said stator; and
 said side wall being inclined relative to a radial direction, in order to produce a component of a deformation force produced due to a rotation directed in the radial direction.

6. The electric motor according to claim 5, wherein:
 said holding element has a base in a region of said feed-through opening for increasing a bending resistance of said holding element, said base having a front side disposed on an outside in a circumferential direction, creating a bearing region for said housing floor during a rotation of said stator;
 said front side of said holding element being oriented to extend parallel to said side wall when placed against said side wall.

7. The electric motor according to claim 1, wherein said holding element has a base in a region of said feed-through opening for increasing a bending resistance of said holding element, said base having a front side disposed on an outside in a circumferential direction, creating a bearing region for said housing floor during a rotation of said stator.

8. The electric motor according to claim 1, wherein said feed-through opening has an extent in a circumferential direction configured to limit torsion of said stator to under 5°.

9. The electric motor according to claim 8, wherein said extent of said feed-through opening limits the torsion of said stator to under 2°.

10. The electric motor according to claim 8, wherein said extent of said feed-through opening limits the torsion of said stator to under 1°.

11. A motor housing for the electric motor according to claim 1, wherein said housing floor has said feed-through opening for said phase connection of said stator, and a side wall delimits said feed-through opening in a circumferential direction, said side wall being inclined relative to a radial direction.

* * * * *